May 28, 1946. A. R. PARILLA 2,401,097
AUTOMATICALLY RETRACTIBLE LANDING GEAR
Filed Aug. 23, 1940 3 Sheets-Sheet 1

Inventor
Arthur R. Parilla,
By Lee F. Townsend
Attorney

May 28, 1946. A. R. PARILLA 2,401,097
AUTOMATICALLY RETRACTIBLE LANDING GEAR
Filed Aug. 23, 1940 3 Sheets-Sheet 2
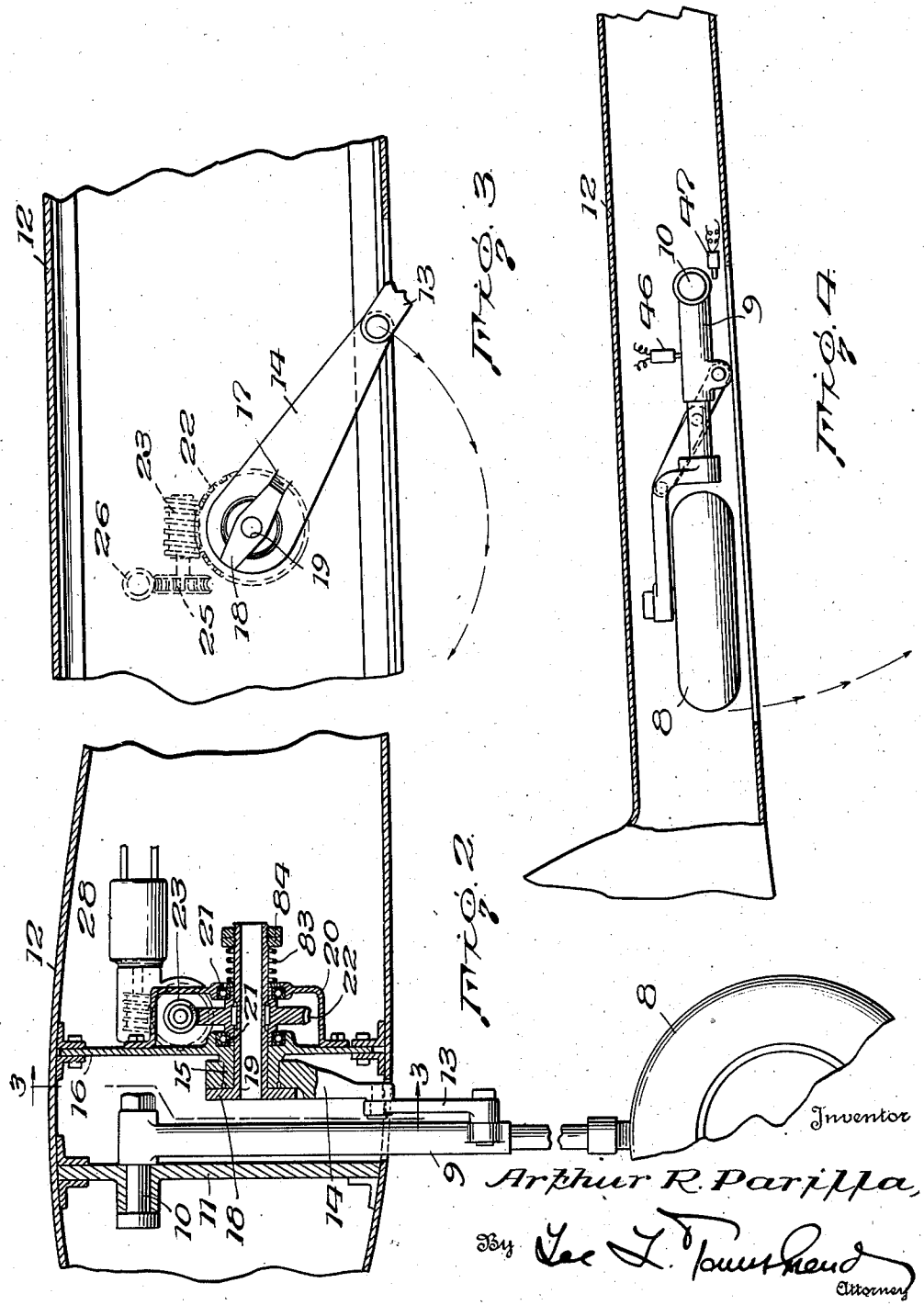

May 28, 1946. A. R. PARILLA 2,401,097
AUTOMATICALLY RETRACTIBLE LANDING GEAR
Filed Aug. 23, 1940 3 Sheets-Sheet 3
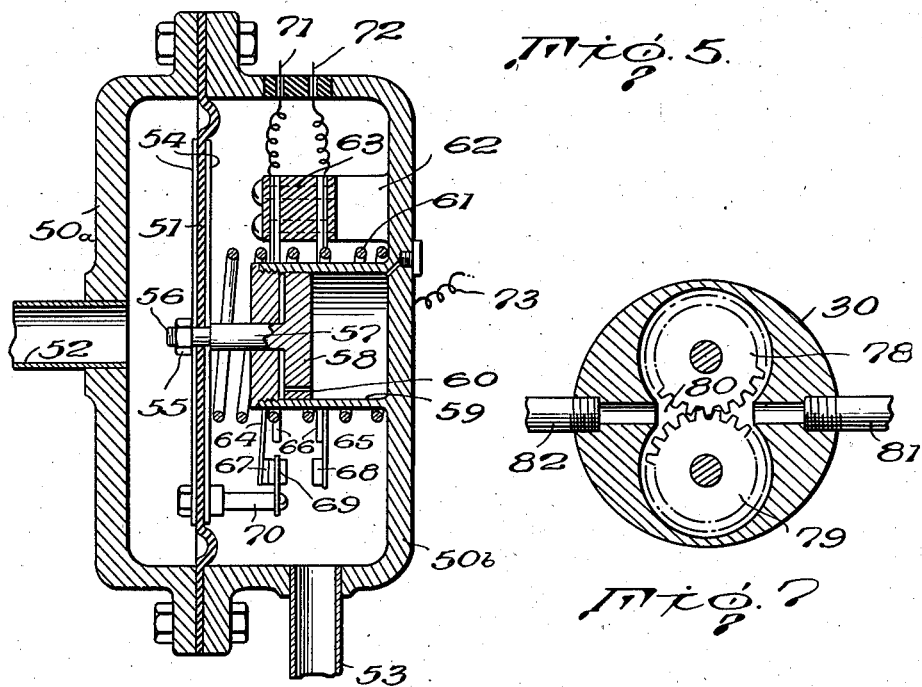
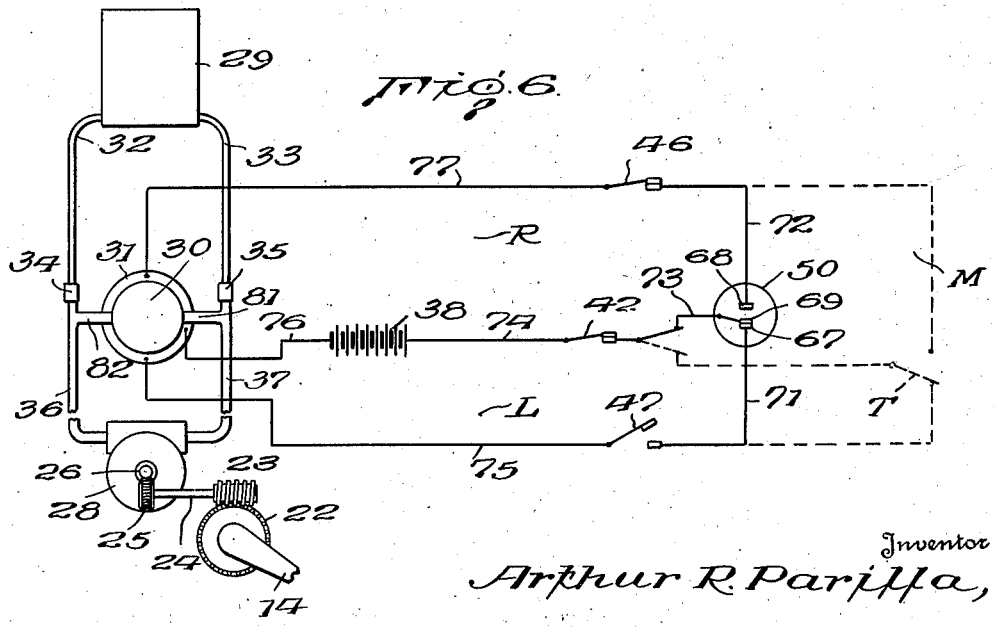
Inventor
Arthur R. Parilla,
By Lee L. Townsend
Attorney Patented May 28, 1946

2,401,097

UNITED STATES PATENT OFFICE 2,401,097

AUTOMATICALLY RETRACTABLE LANDING GEAR

Arthur R. Parilla, Garden City, N. Y.

Application August 23, 1940, Serial No. 353,938

9 Claims. (Cl. 244—102)

This invention relates to aircraft, and is concerned particularly with landing gear therefor, whether it be of the wheeled or pontoon type; comprehending, also, wing flaps and other lift and/or drag increasing devices. The term "landing gear" as herein employed is generically applied to all such apparatus.

An object of the invention is to provide aircraft landing gear operative to or from extended or retracted position through the agency of means responsive to and controlled by the air speed of the craft with which it is associated, whereby the operation of the landing gear is rendered automatic.

Another object is to provide a novel operating mechanism for retracting and extending airplane landing gear means.

Still another object is to provide, in a retractable landing gear for aircraft, a novel mechanism for raising and/or lowering the same only when the craft has reached a predetermined air speed.

A further object of the invention is to eliminate all manual operations to operate mechanical locks and/or hydraulic control valves to achieve fully automatic hydraulic operation with the use of an air speed automatic switch.

A still further object is to provide a simple, compact transmission which may be conveniently mounted with respect to the airplane landing gear as the actuating means for operating the gear, and which may be manufactured in standardized sizes for airplanes in various classifications.

Other objects will be readily apparent to those skilled in the art. It is to be understood that the instant disclosure constitutes a practical embodiment of the invention, and that within its claimed scope the invention may be practiced by the employment of means other than as specifically shown and described.

In the accompanying drawings:

Figure 2 is substantially a fore and aft vertical section through an airplane wing structure, illustrating a landing wheel in fully lowered position, and with portions of the transmission mechanism shown in section.

Figure 3 is a vertical section taken substantially on the line 3—3 of Figure 2.

Figure 4 is a fragmentary front elevation, partly in section, of a wing structure with its landing wheel housed therein in fully retracted position.

Figure 5 is a section taken centrally through an air-speed controlled circuit closer by which the operating mechanism is controlled.

Figure 6 is a schematic plan of the hydraulic operating system for raising and lowering the landing gear, with the electrical actuator circuits shown in diagram.

Figure 7 is a detail elevation of the hydraulic pump forming a part of the system.

Figure 1:
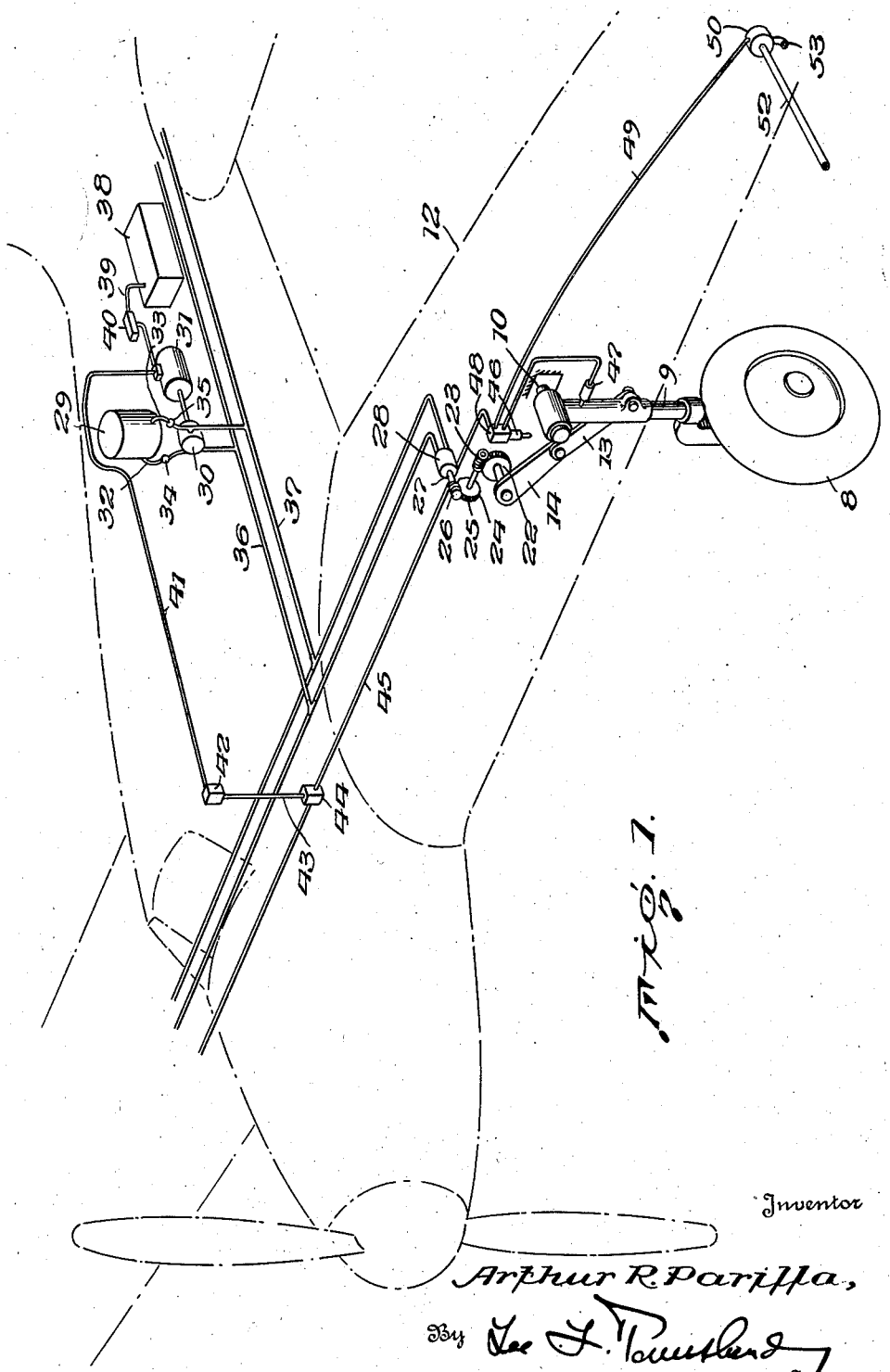
Figure 1 is a perspective view of an installation of the landing gear and its operating means as applied to an airplane.

The illustrated embodiment of the invention comprises an airplane landing gear of the type having wheels which fold up within the wings when retracted. The relative arrangement and disposition of the component elements of the system are shown in Figure 1 in which the left landing wheel 8 has its shock absorbing strut 9 pivotally connected at its upper end to a stub shaft 10 mounted in a reinforcing plate 11 of the wing structure 12. Although only one wheel is shown and described, it will be understood that the structure is identical for the right wing wheel and the auxiliary wheel at the tail assembly, not shown.

A link 13 is pivotally connected at one end to the mid portion of the wheel strut, and at its other end to the free end of a crank 14 which is journalled on the hub portion 15 of a housing plate 16 that is bolted or otherwise rigidly secured to the wing structure; see Figure 2. The outer face of the crank has formed therein a pair of diametrically opposed radial slots 17 which provide keyways for interlocking engagement with the head 18 of a hollow T-shaft 19 which extends through the hub 15 and through the wall of a housing 20 that is bolted to the plate 16. The shaft is supported by anti-friction bearings 21 in the hub and housing wall respectively.

Within the housing 20 the shaft 19 has splined thereto a gear 22 meshed with a worm 23 carried by a driven shaft 24 that bears in the wall of the housing and which has at its outer end a gear 25 that is meshed with a worm 26 on the end of the drive shaft 27 of a turbo-motor 28 of the hydraulic type. The turbine 28 is suitably secured within the wing structure. A closed hydraulic system is provided for driving the motor 28. This system, illustrated in Figure 1, comprises a fluid reservoir 29, a gear pump 30 driven by an electric motor 31, and the wheel operating turbines 28 connected in parallel. Fluid conduits 32 and 33 controlled, respectively, by check valves 34 and 35, lead from the reservoir to opposite ports of the pump 30 which are in turn in communication by means of the pipe lines 36 and 37 with the turbines. Figure 1 shows that the pipe lines branch to include the turbines of all wheels.

The electric motor 31 is reversible and receives its operating current from a source 38, such as a storage battery; the circuit wires being housed within a conduit 39 which leads to a junction box 40 and thence to the motor. The control circuit wires for the motor 31 are carried through a conduit 41 to a master switch 42 adjacent the pilot's seat, thence through the conduit 43 to the junction box 44 and from there through distribution conduits 45 to limit switches 46 and 47 adjacent the wheel, passing through the junction box 48. From the box 48 the circuit wires lead through a conduit 49 to the air speed switch 50 which preferably is associated with the usual Pitot-static tube of the air speed indicator, carried at the wing tip.

The air speed switch, detailed in Figure 5, comprises a casing consisting of two sections 50a and 50b bolted together to support a flexible diaphragm 51 therebetween which divides the casing interior into two non-communicating chambers. The front chamber has a central air inlet through a dynamic air pressure pipe 52 which may be the Pitot tube of air speed indicator, while the chamber behind the diaphragm opens through a static pressure pipe 53, which may be the static tube of the air speed indicator. The central portion of the diaphragm is stiffened by rigid facing plates 54 clamped against opposite sides thereof by means of a nut 55 threaded on the outer end of a stem 56 provided as a reduced axial extension of a piston rod 57 arranged in the axis of the casing; the shoulder formed on the rod as a result of the reduction constituting an abutment against which the facing plates and diaphragm are clamped as the nut is tightened.

A piston 58 on the inner end of the piston rod reciprocates within a dash-pot cylinder 59 carried by the rear casing section 50b, and the piston is provided with a restricted bleeder passage 60 extending therethrough, whereby, on the familiar principle of dash-pots, the piston will move under the application of sustained force but will be highly resistant to a force suddenly applied. An expansion spring 61 surrounds the cylinder and bears against the diaphragm and casing wall, normally urging the piston into forward position as shown in Figure 5.

Adjacent the cylinder the rear wall of the casing carries a post 62 on which is mounted a block 63 of insulating material. The block has secured thereto in spaced and electrically insulated relation a pair of metallic spring fingers 64 and 65 that are capable of free separating movement but which are restrained against movement toward one another by stop members 66 attached to the insulating block 63 and underlying the major portion of each finger. Contact points 67 and 68 are carried by the respective fingers and are maintained in a predetermined spaced relation by the stop members 66. A third contact 69 plays between the contacts 67 and 68 in accordance with flexation of the diaphragm 51. This third contact is carried by the inner end of a binding post member 70 that is bolted to the diaphragm in electrical connection with the metallic face plates 54 which are, in turn, electrically grounded to the metallic casing structure by means of the piston, cylinder and the spring 61. Wires 71, 72, and 73 of the electrical control circuit are connected, respectively, to the contact fingers 64 and 65 and to the casing.

The system arrangement is shown in Figure 6, in which the various switches and mechanical parts appear in the positions they assume when the landing gear is in fully lowered and locked position. The electrical system consists of a gear retracting circuit R and a gear lowering circuit L. The lowering circuit may be traced from the battery 38, through wire 74 to master switch 42, through wire 73 to the air speed switch 50, through contacts 69 and 67, through wire 71 to limit switch 47, through wire 75 to a terminal of the pump motor 31, and from another terminal of the motor through wire 76 back to the battery. In similar manner the retracting circuit runs from the battery through wire 74 to the master switch 42, through wire 73 to the air speed switch 50, through its contacts 69 and 68 and wire 72 to the limit switch 46, through wire 77 to a terminal of the pump motor, thence returning through wire 76 to the battery. A manual control circuit M, indicated by dotted lines, may be imposed on the system, being opened and closed by a toggle switch assembly generally indicated at T, and in parallel with the air speed switch, so that the landing gear may be raised or lowered independently of the air speed control.

The hydraulic pump 30 is of a known type, shown in Figure 7, in which the teeth of meshed gears 78 and 79 constitute the fluid propulsion means. The fluid enters the impeller space through port conduits 81 and 82 which are, respectively, in communication with the conduits 33—37 and 32—36, see Figure 1. The impeller gears are driven from the shaft of the reversible electric motor 31, making the system entirely reversible.

With reference to Figures 1 and 6, it will be seen that when the landing gear is fully lowered its absorber strut 9 depresses the plunger of the limit switch 47 and opens its circuit. When the gear is retracted it rises and is housed within the wing structure, as seen in Figure 4, and when it is fully raised the strut 9 depresses the plunger of the limit switch 46 to open its circuit. The switches automatically close when pressure is released from their plungers. When the gear is fully lowered or fully raised it becomes locked, due to the low helix angle of the worms 23 and 26. The self locking action of such worms is well known. The provision of low helix angle worm and gear insures that the wheels will be automatically locked when in retracted or extended position.

When the speed of an airplane after leaving the ground rises to a predetermined point, the system operates automatically to raise and lock the landing gear. This occurs by reason of the fact that the dynamic air pressure through the pipe 52 against the front of the diaphragm in the air speed switch rises with increasing air speed and forces the diaphragm rearwardly to the point at which the contacts 69 and 68 engage to complete closing of the retracting circuit R which is already closed at the master switch 42 and at limit switch 46. Closing of the circuit R immediately sets into operation the electric motor 31 and the hydraulic pump 30. Fluid is thereupon circulated in the power system to operate the turbine 28 and its associated worm gear train. This operation rotates the crank 14, (preferably through 180 degrees) lifting the wheel 8 into its housing in the wing.

When the wheel reaches fully retracted position, as seen in Figure 4, the strut 9 opens the limit switch 46 to break the retracting circuit and stop the motor and pump. The circuit remains open at the limit switch, irrespective of continued engagement of the air speed switch contacts 69 and 68, and the worm gear automatically locks to hold the wheel fully retracted.

When air pressure against the front of the diaphragm decreases, as when the air speed of the craft drops when approaching a landing field, the action of the spring 61 in the air speed switch returns the diaphragm to initial position, disengaging the contacts 69 and 68 and, when the pressure has lowered sufficiently, engaging the contacts 69 and 67. Current now flows in the closed lowering circuit L and the motor and system are reversely operated to force the wheel down into fully lowered position. Lowering of the wheel continues until the strut 9 engages and opens the limit switch 47 to break the circuit. At this point the crank 14 and link 13 are in dead center alignment and the wheel shock absorber strut is at the true vertical, thus insuring that the load of the landing strain is taken directly by the wing structure. The automatic locking action of the worm gear holds the wheel in its proper position for landing.

Emergency release of the landing gear may be effected by laterally shifting the shaft 19 to disengage its T-head from the slots in the crank face. Normally, the shaft head is held in interlocked engagement with the crank by means of a coiled expansion spring 83 surrounding the inner end of the shaft and abutting against the housing 26 at one end and against an adjusting nut 84 threaded on the shaft end. Any suitable means, not shown, under control of the pilot may be utilized to effect shifting of the shaft to permit the crank to turn freely on its bearing hub and allow the landing gear to drop down into extended position.

When the landing gear reaches fully extended position the slots in the crank face become realigned with the T-head of shaft 19, and the expansion of spring 83 effects a lateral shifting of the shaft which re-engages the T-head in the crank face slots and locks the gear in down position. In the emergency release operation as described, the shaft 19 shifts laterally in an axial direction, but does not rotate. As the crank face slots are diametrically opposed, when the crank has rotated through 180 degrees the realignment of slots and T-head occurs irrespective of the direction of rotation of the crank. It is within the province of the invention that should the operative rotation of the crank be less than 180 degrees, the crank face slots will be radially arranged in proper number and disposition to permit the interlocking engagement of crank and T-head at the desired points.

The air-speed switch may be designed so that the air-speed at which the gear will retract after take-off will be somewhat higher than the speed at which it will lower before landing. This will insure a safe take-off before the wheels retract. It will then prevent the wheels from lowering at low cruising speeds, or until speeds near the landing speed are reached.

This can be done by varying the gap between contacts 67 and 68 (Fig. 5) and the spring rate of the coil spring, (61). A greater force, (and consequently air speed) will be necessary to close contact 67 than is necessary when contact 68 closes when the diaphragm returns to its former position.

During one maneuver, the spin, the dynamic pressure against the diaphragm may be insufficient, and may be sustained for a long period of time. In that event, the wheels will automatically extend into landing position.

As the lowering of the landing gear affects the air resistance of the craft in flight, and shifts its center of gravity, the automatic lowering action which results from a sustained drop in the dynamic air pressure against the diaphragm 51 such as would occur were the craft to go into a spin will assist in bringing the ship out of the spin, and when the pressure again builds up in the dynamic pressure chamber of the air speed switch the wheels will automatically be returned to retracted position.

It is within the purview of my invention to utilize any suitable power means to raise and lower the landing gear, the hydraulic type illustrated herewith being preferable as it is customary in certain types of aircraft to actuate other devices by hydraulic means.

I claim:

1. A retractable landing gear system for aircraft, comprising in combination, a closed hydraulic system including a fluid motor and a fluid pump, landing gear means operatively connected with said motor by self-locking means for raising and lowering as the motor is operated, a reversible electric motor, a driving connection between said electric motor and the pump to drive the fluid in either direction, reversely arranged operating circuits for said electric motor, and a fluid pressure responsive switch common to said circuits for selective closing thereof, said switch being operative by dynamic air pressure.

2. A retractable landing gear system for aircraft comprising in combination a hydraulic system including a reversible hydraulic pump for reversing fluid flow in the system, a reversible electric motor, a driving connection between said electric motor and the pump, reversely arranged operating circuits for the electric motor, a fluid pressure responsive switch operative by dynamic air pressure common to said circuits for selective closing thereof, multiple landing gear units, a hydraulically operated turbine in the system for each unit for raising and lowering the same and a worm and gear drive between each turbine and unit.

3. The combination in a power operated landing gear mechanism for aircraft having a landing wheel swingable under power to raised and lowered positions including an operating crank and source of power, of a unitary self-locking transmission mounted on the aircraft between the source of power and the crank and connected with the source of power, and a spring pressed clutch connecting the output side of the transmission and crank releasable in an emergency to permit the landing wheel to drop by gravity should the power operating mechanism become inoperative when the landing wheel is in raised position.

4. The combination in a power operated landing gear mechanism for aircraft having a landing wheel swingable under power to raised and lowered positions including an operating crank and source of power, of a unitary self-locking transmission mounted on the aircraft between the source of power and the crank and connected with the source of power, a spring pressed clutch connecting the output side of the transmission and crank releasable in an emergency to permit the landing wheel to drop by gravity should the power operating mechanism become inoperative when the landing wheel is in raised position, and means on the shaft automatically re-engaged by said clutch when the landing wheel reaches lowered position.

5. A power operated retractable landing gear mechanism for aircraft including a housing unit adapted to be mounted on the aircraft including a self-locking transmission connected with a source of power and a crank for operating the landing gear, a hub extending from a wall of said housing upon which the crank for operating the landing gear is adapted to be mounted, a driven shaft rotatable in said housing and extending axially through the hub, means on the shaft effecting a driving connection between the shaft and crank, and said shaft being movable axially to disconnect said driving connection.

6. A power operated retractable landing gear mechanism for aircraft including a housing unit adapted to be mounted on the aircraft including a self-locking transmission connected with a source of power and a crank for operating the landing gear, a hub extending from a wall of said housing upon which the crank for operating the landing gear is adapted to be mounted a driven shaft rotatable in said housing and extending axially through the hub, and clutch means associated with said shaft for operatively connecting or disconnecting the transmission and crank.

7. A power operated retractable landing gear mechanism for aircraft including a housing unit adapted to be mounted on the aircraft including a self-locking transmission connected with a source of power and a crank for operating the landing gear, a hub extending from a wall of said housing upon which the crank for operating the landing gear is adapted to be mounted, a driven shaft rotatable in said housing and extending axially through the hub, and a spring pressed clutch associated with said shaft and normally engageable with the crank for operatively connecting or disconnecting the transmission and crank.

8. In a power operated retractable landing gear mechanism for aircraft, a housing unit mounted on the aircraft having a hub extending from one wall thereof, a rotatable crank for operating the landing gear mounted on said hub, a shaft rotatable in said housing, a transmission in said housing including a self-locking worm and wheel connected with a source of power and with the wheel having a driving connection with the shaft, the end portions of said shaft extending from the housing with one end passing axially through the hub, means on said end of the shaft for effecting a driving connection between the shaft and crank, a tension spring on the other projecting end of the shaft normally effecting such engagement, and said shaft being movable axially independently of its wheel against the tension of the spring to disconnect the shaft and crank.

9. The combination in a power operated landing gear mechanism for aircraft having a landing wheel swingable under power to raised and lowered positions including an operating crank and source of power, of a unitary self-locking transmission mounted on the aircraft between the source of power and the crank and connected with the source of power, emergency releasing means connecting the output side of the transmission and crank operable to permit the landing wheel to drop by gravity should the power operating mechanism become inoperative when the landing wheel is in raised position, and means to automatically lock said landing wheel when the same reaches lowered position.

ARTHUR R. PARILLA.